United States Patent
Suciu et al.

(10) Patent No.: US 10,422,243 B2
(45) Date of Patent: Sep. 24, 2019

(54) GAS TURBINE ENGINE DUAL TOWERSHAFT ACCESSORY GEARBOX AND STARTER GENERATOR ASSEMBLY

(71) Applicant: United Technologies Corporation, Farmington, CT (US)

(72) Inventors: Gabriel L. Suciu, Glastonbury, CT (US); Hung Duong, Unionville, CT (US); Jonathan F. Zimmitti, Glastonbury, CT (US); William G. Sheridan, Southington, CT (US); Michael E. McCune, Colchester, CT (US); Brian Merry, Andover, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 269 days.

(21) Appl. No.: 15/410,049

(22) Filed: Jan. 19, 2017

(65) Prior Publication Data

US 2018/0202310 A1    Jul. 19, 2018

(51) Int. Cl.
*F01D 15/12*    (2006.01)
*F02C 7/268*    (2006.01)
(Continued)

(52) U.S. Cl.
CPC .............. *F01D 15/12* (2013.01); *F01D 5/06* (2013.01); *F01D 15/10* (2013.01); *F01D 25/20* (2013.01); *F02C 7/268* (2013.01); *F02C 7/277* (2013.01); *F02C 7/32* (2013.01); *F02C 7/36* (2013.01); *F16H 3/30* (2013.01); *F05D 2220/32* (2013.01);
(Continued)

(58) Field of Classification Search
CPC .......... F01D 15/08; F01D 15/10; F01D 15/12; F02C 7/32; F02C 7/36; F02C 7/26; F02C 7/268; F02C 7/275; F05D 2220/76; F05D 2220/76; F05D 2260/85
See application file for complete search history.

(56) References Cited

U.S. PATENT DOCUMENTS 5,867,979 A    2/1999  Newton et al.
7,500,365 B2   3/2009  Suciu et al.
(Continued)

FOREIGN PATENT DOCUMENTS

EP    2192291    6/2010
EP    2320067    5/2011
(Continued)

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
(Continued)

*Primary Examiner* — Scott J Walthour
(74) *Attorney, Agent, or Firm* — Carlson, Gaskey & Olds, P.C.

(57) ABSTRACT

An exemplary gas turbine engine assembly includes a transmission coupling a starter generator assembly to a first set of gears. The transmission is transitionable between a first mode where the starter generator assembly is driven at a first speed relative to the second towershaft, and a second mode where the starter generator assembly is driven at a different, second speed relative to the second towershaft.

20 Claims, 7 Drawing Sheets

(51) Int. Cl.
*F01D 5/06* (2006.01)
*F01D 15/10* (2006.01)
*F01D 25/20* (2006.01)
*F16H 3/30* (2006.01)
*F02C 7/277* (2006.01)
*F02C 7/32* (2006.01)
*F02C 7/36* (2006.01)

(52) U.S. Cl.
CPC .. *F05D 2240/60* (2013.01); *F05D 2260/4023* (2013.01); *F05D 2260/4031* (2013.01)

(56) References Cited

U.S. PATENT DOCUMENTS

| | | | |
|---|---|---|---|
| 7,552,591 B2 | 6/2009 | Bart et al. | |
| 7,698,884 B2 | 4/2010 | Maguire et al. | |
| 7,882,691 B2 | 2/2011 | Lemmers, Jr. et al. | |
| 8,015,828 B2 | 9/2011 | Moniz et al. | |
| 8,347,637 B2 | 1/2013 | Suciu et al. | |
| 8,350,398 B2 | 1/2013 | Butt | |
| 8,511,967 B2 | 8/2013 | Suciu et al. | |
| 8,621,871 B2 | 1/2014 | McCune et al. | |
| 8,814,502 B2 | 8/2014 | Eleftheriou | |
| 2006/0272313 A1* | 12/2006 | Eick | F02C 3/107 60/39.63 |
| 2007/0022735 A1 | 2/2007 | Henry et al. | |
| 2009/0000308 A1* | 1/2009 | Cloft | F02C 7/32 60/802 |
| 2011/0101693 A1* | 5/2011 | Goi | F02C 7/275 290/46 |
| 2013/0071242 A1* | 3/2013 | Caprario | F02C 7/12 415/230 |
| 2013/0145774 A1 | 6/2013 | Duong et al. | |
| 2014/0020506 A1 | 1/2014 | Duong | |
| 2015/0065285 A1* | 3/2015 | McCune | F16H 57/0423 475/159 |
| 2015/0369128 A1* | 12/2015 | Parnin | F02C 7/06 60/772 |
| 2016/0169118 A1 | 6/2016 | Duong | |
| 2018/0202368 A1* | 7/2018 | Suciu | F02C 7/32 290/32 |

FOREIGN PATENT DOCUMENTS

| | | |
|---|---|---|
| EP | 2540991 | 1/2013 |
| EP | 3032074 | 6/2016 |
| FR | 2921423 | 3/2009 |
| WO | 2008082335 | 7/2008 |
| WO | 2014046713 | 3/2014 |

OTHER PUBLICATIONS

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
Extended European Search Report for EP Application No. 18152643.5, dated Jul. 3, 2018.

* cited by examiner

GAS TURBINE ENGINE DUAL TOWERSHAFT ACCESSORY GEARBOX AND STARTER GENERATOR ASSEMBLY

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A typical gas turbine engine utilizes one or more gearboxes to drive accessory components, such as generators, fuel pumps, and oil pumps. Each of the accessory drive components must be driven at a desired rotational speed. As a result, the accessory is coupled to either the low or high speed spool and geared accordingly to obtain the speed at which the accessory operates more efficiently.

One gearbox has been proposed in which the accessory drive components are driven by a single towershaft. Other gearboxes have been proposed in which some accessory drive components are driven by a first towershaft, and other accessory drive components are driven by a second towershaft.

SUMMARY

In one exemplary embodiment, a gas turbine engine assembly includes a first spool having a first turbine operatively mounted to a first turbine shaft, and a second spool having a second turbine operatively mounted to a second turbine shaft. The first and second turbines are mounted for rotation about a common rotational axis within an engine static structure. The first and second turbine shafts are coaxial with one another. First and second towershafts are respectively coupled to the first and second turbine shafts. The engine further includes an accessory drive gearbox with a set of gears, a starter generator assembly, and a first clutch disposed between the first towershaft and the starter generator assembly. The first clutch is configured to enable the starter generator assembly to drive the first spool through the accessory drive gearbox, and a second clutch disposed between the second towershaft and the starter generator assembly. The second clutch is configured to enable the second spool to drive the starter generator assembly through the accessory drive gearbox. A transmission couples the starter generator assembly to the first set of gears. The transmission is transitionable between a first mode where the starter generator assembly is driven at a first speed relative to the second towershaft, and a second mode where the starter generator assembly is driven at a different, second speed relative to the second towershaft.

In another example of the above described gas turbine engine assembly, the first and second turbine shafts are outer and inner shafts, respectively, and the first and second turbines are high and low pressure turbines, respectively.

In another example of any of the above described gas turbine engine assemblies, the first towershaft is configured to rotate at a higher speed than the second towershaft.

In another example of any of the above described gas turbine engine assemblies, the transmission is further transitionable to a third mode where the starter generator assembly is driven at a different, third speed relative to the second towershaft.

In another example of any of the above described gas turbine engine assemblies, the transmission is further transitionable to at least one fourth mode where the starter generator assembly is driven at a fourth speed relative to the second towershaft. The fourth speed is different than each of the first, second, and third speeds.

Another example of any of the above described gas turbine engine assemblies further includes an oil pump. The starter generator assembly is driven by the second towershaft at a first speed relative to the oil pump when the transmission in first mode, and the starter generator assembly is driven by the second towershaft at a different, second speed relative to the oil pump when the transmission is in the second mode.

In another example of any of the above described gas turbine engine assemblies, the oil pump is configured to communicate oil to a geared architecture that drives a fan of the gas turbine engine at a lower speed than the second turbine shaft.

Another example of any of the above described gas turbine engine assemblies further includes a fan driven by a speed reduction device, wherein the speed reduction device is driven by the second turbine shaft.

In another example of any of the above described gas turbine engine assemblies, the first clutch and the second clutch are one-way mechanical clutch devices.

In another example of any of the above described gas turbine engine assemblies, the starter generator assembly comprises a first variable frequency generator and a second variable frequency generator.

In another example of any of the above described gas turbine engine assemblies, the starter generator assembly comprises a first integrated drive generator and a second integrated drive generator.

An exemplary method of operating a gas turbine engine includes driving a first spool with a starter through a first towershaft and a first clutch to start the engine, driving a starter generator assembly through an accessory gearbox through a second clutch with a second towershaft coupled to a second spool once the engine is started, and decoupling the starter from the first spool once the first spool reaches an engine idle speed.

Another example of the above described exemplary method of operating a gas turbine engine includes driving the starter generator through a transmission in a first mode so that the starter generator assembly is rotated at a first speed relative to the second towershaft, and transitioning the transmission to a second mode so that the starter generator is driven by the second towershaft and rotated at a different, second speed relative to the second towershaft.

Another example of any of the above described exemplary methods of operating a gas turbine engine includes transitioning the transmission to a third mode, and driving the transmission with the second towershaft to rotate the starter generator assembly at a different, third speed relative to the second towershaft.

Another example of any of the above described exemplary methods of operating a gas turbine engine includes driving an oil pump with the second towershaft when the starter generator is driven by the second towershaft through the transmission, the oil pump driven at a first speed relative the second towershaft when the transmission is in the first mode, and when the transmission is in the second mode.

Another example of any of the above described exemplary methods of operating a gas turbine engine includes supplying oil to from the oil pump to a geared architecture that drives a fan of the gas turbine engine at a lower speed than the second spool.

In another example of any of the above described exemplary methods of operating a gas turbine engine, the decoupling includes rotating the second towershaft at a speed greater than that of the starter.

Another example of any of the above described exemplary methods of operating a gas turbine engine, includes driving a fan through a speed reduction device with a shaft of the second spool.

In another example of any of the above described exemplary methods of operating a gas turbine engine, the first clutch and the second clutch are one-way mechanical clutch devices.

In another example of any of the above described exemplary methods of operating a gas turbine engine, the starter generator assembly comprises a first variable frequency generator and a second variable frequency generator.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
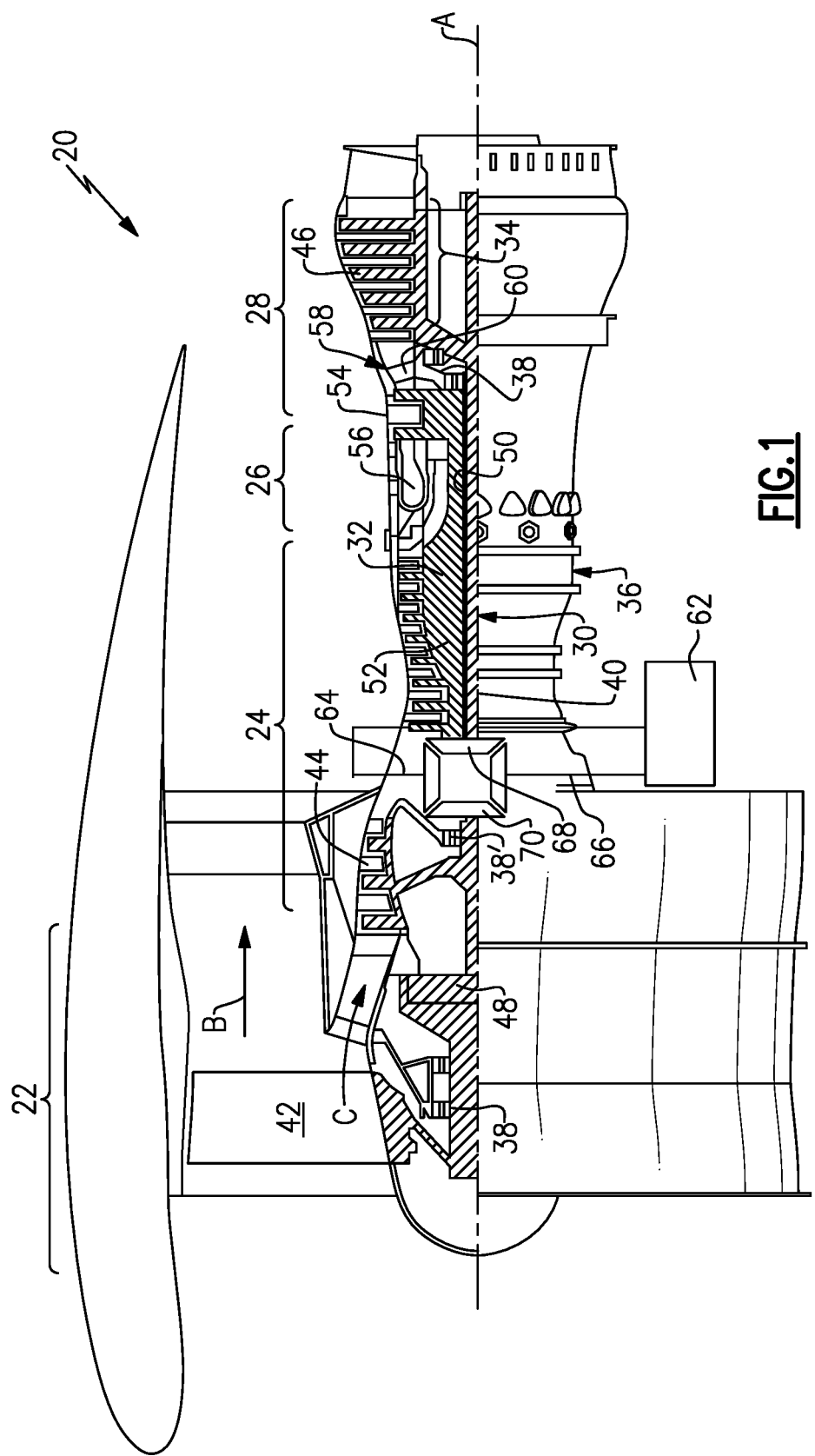
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, the geared architecture 48 may be located aft of combustor section 26 or even aft of turbine section 28, and fan section 22 may be positioned forward or aft of the location of the geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The example engine 20 includes a first towershaft 64 that is engaged to drive the high speed spool 32. The engine 20 further includes a second towershaft 66 that is engaged to be driven by the low speed spool 30. The low speed spool 30 includes a gear 70 and the high speed spool 32 includes a gear 68. The gear 68 is engaged to the first towershaft 64 and the gear 70 is engaged to the second towershaft 66. In one disclosed embodiment the gears 68 and 70 are bevel gears and engage corresponding bevel gears on the corresponding first or second towershaft 64, 66.

Figure 2:
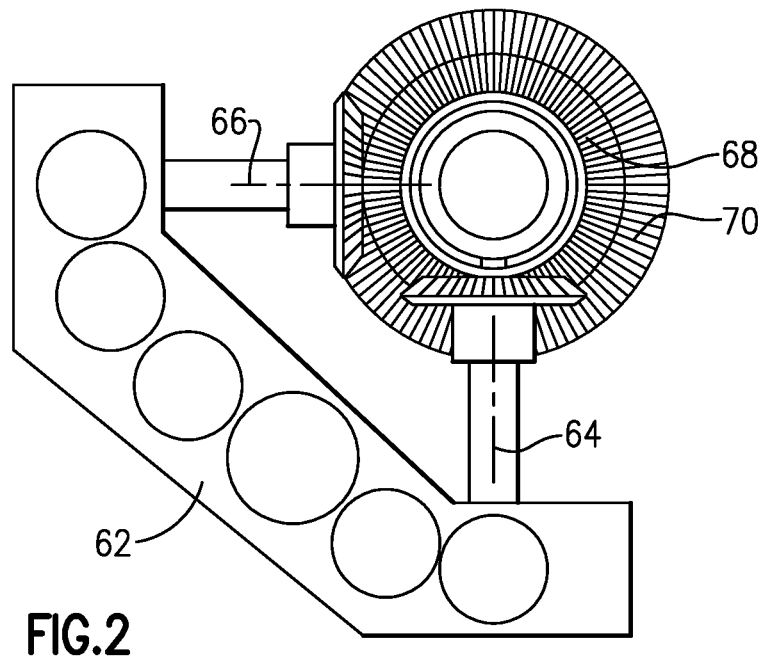
FIG. 2 is a schematic view illustrating a common accessory drive gearbox driven by both high and low speed spools.

Referring to FIG. 2 with continued reference to FIG. 1, the example gearbox 62 includes a gear engagement with both the first towershaft 64 and the second towershaft 66. The towershafts 64, 66 interface with a common accessory gearbox 62 and enable the use of the low speed spool 30 to drive the accessory components within the accessory gearbox 62.

Figure 3:
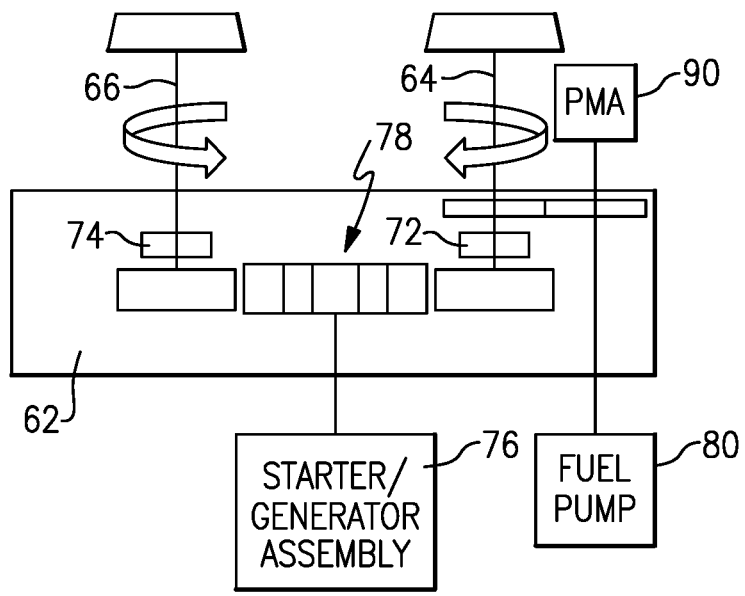
FIG. 3 is a schematic view of the example accessory gearbox of FIG. 2 and towershafts.

Referring to FIG. 3 with continued reference to FIG. 2, a first clutch 72 is engaged to the first towershaft 64 coupled to the high speed spool 32. A second clutch 74 is disposed on the second towershaft 66 driven by the low speed spool 30. Each of the clutches 74 and 72 provide for the transmission of torque in a single direction. The accessory gearbox 62 is engaged to a starter generator assembly 76 that drives a set of gears 78 selectively meshing with both the first towershaft 64 and the second towershaft 66.

In the disclosed example, the clutches 72 and 74 are sprag clutches that only allow torque to be transmitted in one direction. When torque is reversed, meaning that the driving member becomes the driven member, the clutch will slip and allow the driving member to overspeed relative to the driven member. In this example, the second clutch 74 will allow the low speed spool 30 to drive the starter generator assembly 76, but does not allow the starter generator assembly 76 to drive low speed spool 30. In the FIG. 3 example, the first clutch 72 can be located within the accessory gearbox 62, however, the first clutch 72 may be located wherever practical to provide the selective application of torque between the starter generator assembly 76 and the first towershaft 64. Similarly, the second clutch 74 can be located wherever practical to provide selective application of torque.

The first clutch 72 is configured to allow the starter generator assembly 76 to drive the high speed spool 32 but not to allow the high speed spool 32 to drive the starter generator assembly 76. In this example, because the high speed spool 32 will rotate much faster than the starter generator assembly 76, the first clutch 72 is configured such that the high speed spool 32 may over speed past the speed of the starter generator assembly 76 and not transmit torque to the starter generator assembly 76 through the first towershaft 64.

Figure 4:
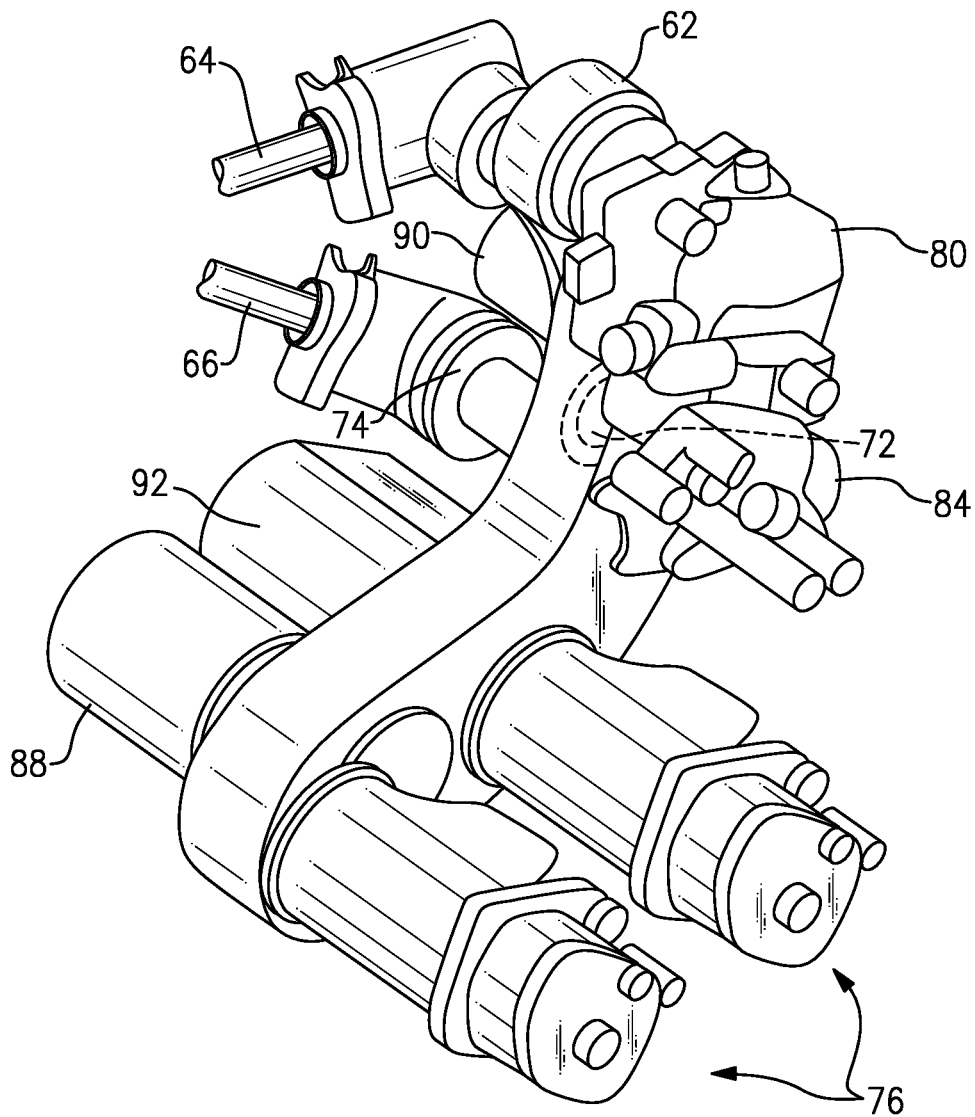
FIG. 4 is a perspective view of the accessory drive gearbox of FIG. 2 with the accessory drive components mounted thereto.

Referring now to FIG. 4 with continuing reference to FIG. 3, the accessory gearbox 62 is used to drive the starter generator assembly 76, and a number of other accessory components, including, but not limited to a fuel pump 80, an oil pump 84, a hydraulic pump 88, and a permanent magnet alternator (PMA) 90. The first clutch 72 is positioned such that the first towershaft 64 can selectively drive the fuel pump 80 and the permanent magnet alternator 90. The second clutch 74 is positioned such that the second towershaft 66 can selectively drive the oil pump 84, and further drive the hydraulic pump 88 and the starter generator assembly 76 through a transmission 92.

After the high speed spool 32 has reached sufficient rotational speed, the first clutch 72 effectively decouples rotation of the first towershaft 64, the fuel pump 80, and the permanent magnet alternator 90 from the rotations of the second towershaft 66, the transmission 92, the starter generator assembly 76, the hydraulic pump 88, and the oil pump 84. This permits the first towershaft 64 to drive the fuel pump 80 and the permanent magnet alternator 90 while the second towershaft 66 drives the remaining accessories.

Figure 5:
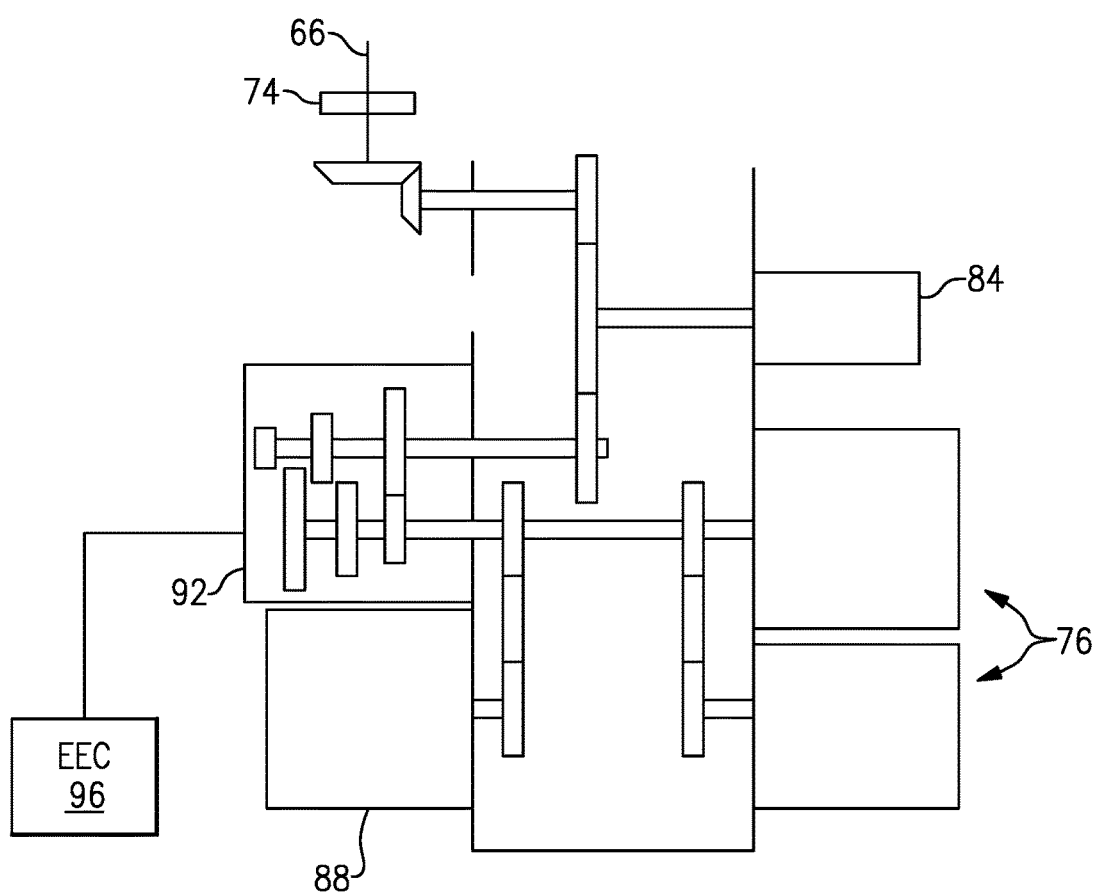
FIG. 5 shows a schematic view of a portion of the accessory drive gearbox of FIG. 4 coupled to a starter generator assembly through a transmission in a first mode.
Figure 6:
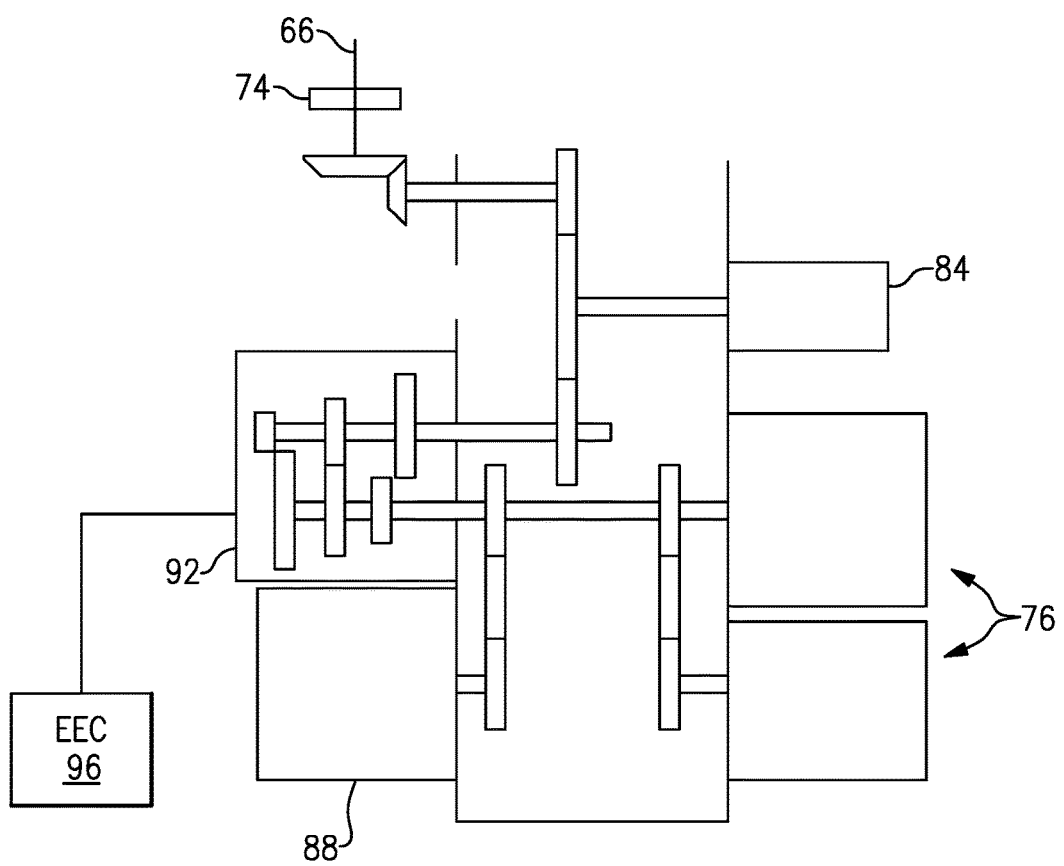
FIG. 6 shows a schematic view of a portion of the accessory drive gearbox of FIG. 4 coupled to the starter generator assembly through the transmission in a second mode.
Figure 7:
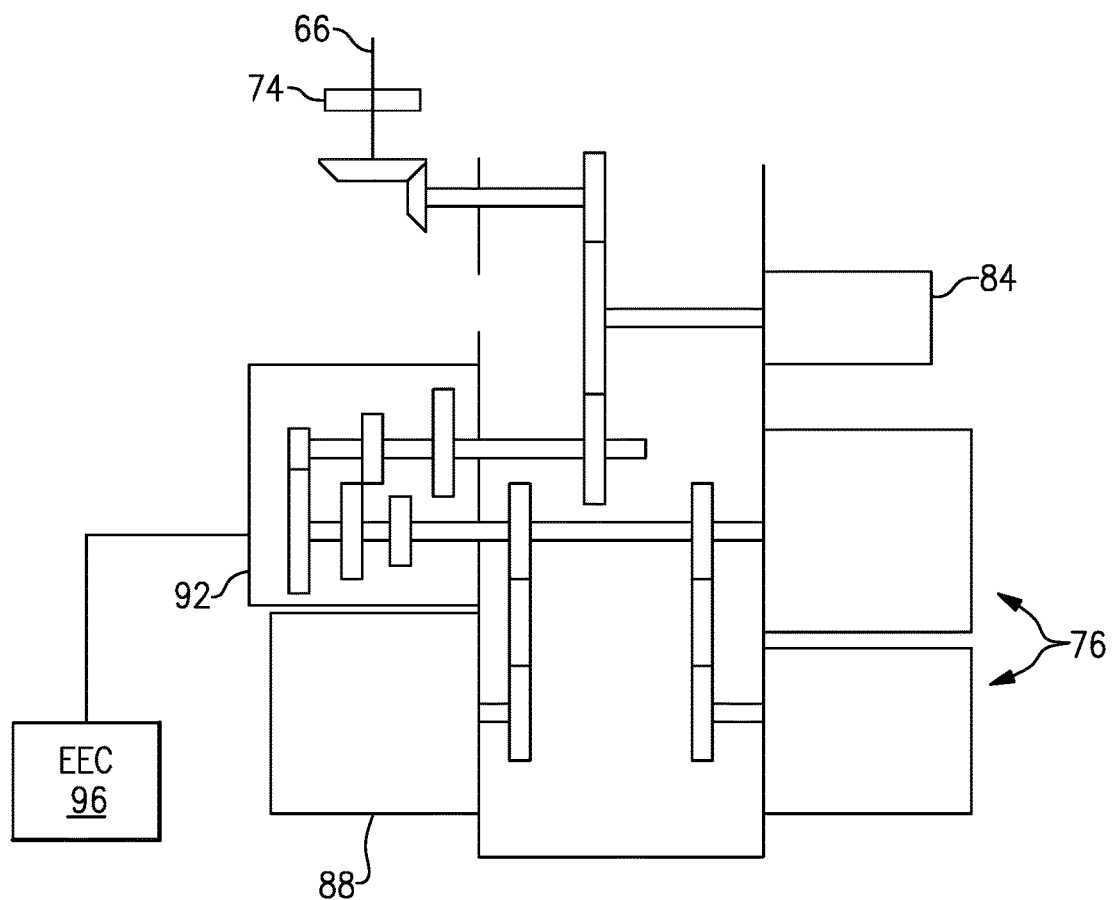
FIG. 7 shows a schematic view of a portion of the accessory drive gearbox of FIG. 4 coupled to the starter generator assembly through the transmission in a third mode.

In an exemplary non-limiting embodiment, the transmission 92 is a three-speed transmission that can transition between a first mode of shown schematically in FIG. 5, a second mode shown schematically in FIG. 6, and a third mode shown schematically in FIG. 7.

In the first mode, the transmission 92 is rotated by the second towershaft 66 and, in response, rotates the hydraulic pump 88 and the starter generator assembly 76 at a first ratio relative to a rotational speed of the second towershaft 66. In the second mode, the transmission 92 is rotated by the second towershaft 66 and, in response, rotates the hydraulic pump 88 and the starter generator assembly 76 at a different, second ratio relative to a rotational speed of the second towershaft 66. In the third mode, the transmission 92 is rotated by the second towershaft 66 and, in response, rotates the hydraulic pump 88 and the starter generator assembly 76 at a different, third ratio relative to a rotational speed of the second towershaft 66.

During operation, the inner shaft 40 can experience a greater range of rotational speeds than the outer shaft 50. That is, the speed excursion for the inner shaft 40 can be higher than the speed excursion for the outer shaft 50. In a specific non-limiting embodiment, the inner shaft 40 can operate at speed excursions of up to 80% during operation of the gas turbine engine 20, whereas the outer shaft 50 can operate at speed excursions of up to 30% during operation of the gas turbine engine 20.

The transmission 92 addresses issues associated with rotating the starter generator assembly 76 and the hydraulic pump 88 with a rotatable input from the second towershaft 66. In the exemplary embodiments, the transmission 92 operates in the first mode when the inner shaft 40 is rotating at a speed excursion of, say, less than 25%. If the speed excursion of the inner shaft 40 meets or exceeds 25%, but is less than 50%, the transmission 92 switches to the second mode to rotate the starter generator assembly 76 and the hydraulic pump 88. If the speed excursion of the inner shaft 40 meets or exceeds 50%, the transmission 92 switches to the third mode to rotate the starter generator assembly 76 and the hydraulic pump 88.

This permits the second towershaft 66 to drive the starter generator assembly 76 and the hydraulic pump 88 through the transmission 92 at three different ratios. The starter generator assembly 76 is thus not required to operate across a range of speed excursions from 0 up to 80% during operation of the gas turbine engine 20. Instead, due to the transmission 92, the range is no more than, say, 30% for the starter generator assembly 76 and the hydraulic pump 88. The starter generator assembly 76 can operate more efficiently when the starter generator assembly 76 and the hydraulic pump 88 is rotated across a smaller range of rotational speeds than across a larger range of rotational speeds.

An electronic engine control (EEC) 96 can control the transition of the transmission 92 between the first mode, the second mode, and the third mode. The EEC 96 could, for example, receive an input corresponding to the rotational speed of the inner shaft 40, and then transition the transmission 92 from the first mode to the second mode or the third mode when the rotational speed exceeds a threshold speed.

Although the exemplary transmission 92 can transition between three modes, other exemplary embodiments of the transmission 92 could transition between more than three modes. In such examples, the transmission 92 is rotated by the second towershaft 66 through the first set of gears 78 and, in response, rotates the starter generator assembly 76 and the hydraulic pump 88 at four or more different ratios relative to a rotational speed of the second towershaft 66.

Figure 8:
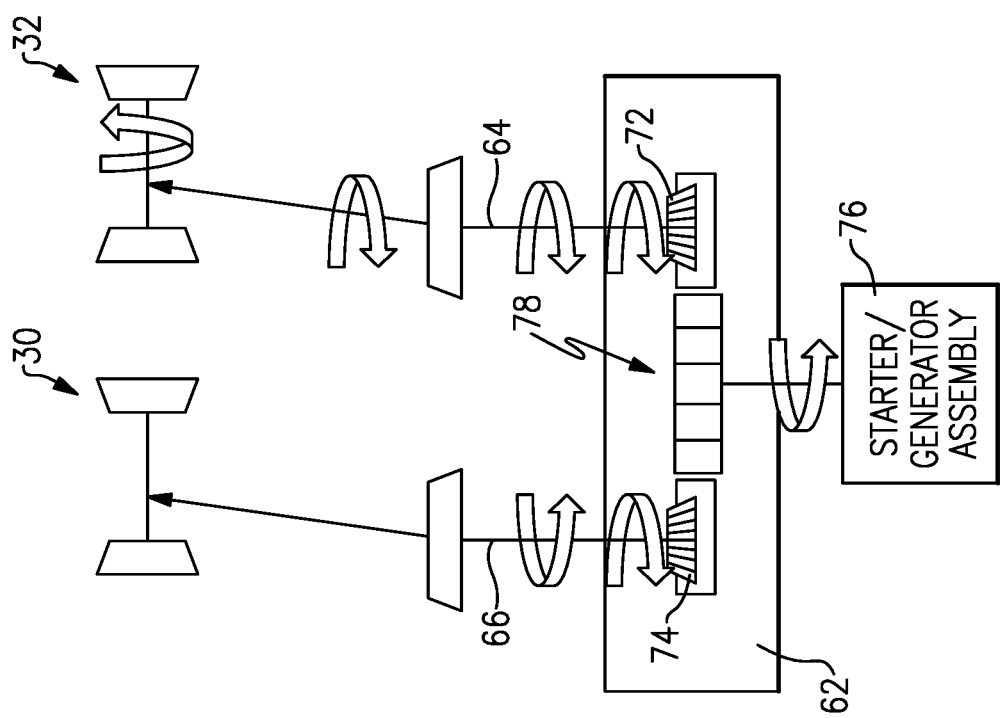
FIG. 8 is a schematic view of accessory gearbox operation during a starting process.

Referring to FIG. 8, the example accessory gearbox 62 is shown during an engine starting operation. In this schematic illustration, the starter generator assembly 76 is shown driving the set of gears 78 within the accessory gearbox 62 that, in turn, drives the first clutch 72 and thereby the first towershaft 64 to drive the high speed spool 32 up to a speed required for starting of the engine 20. The same set of gears 78 driven by the starter generator assembly 76 is also driving the second clutch 74 that is engaged to the second towershaft 66 driven by the low speed spool 30. However, in this instance, the second clutch 74 is not transmitting torque to the low speed spool 30. Accordingly, in the configuration schematically illustrated in FIG. 8, only the high spool 32 is turning.

Once the high speed spool 32 has been spun up to operating conditions, it will attain a speed that is much greater than that input by the starter generator assembly 76 and the first towershaft 64. The first towershaft 64 will continue to rotate in a direction originally provided by the starter generator assembly 76, however, the high speed spool driven towershaft 64 is rotating at a much higher speed and therefore spin past the speed input by the starter generator assembly 76. The first clutch 72 will not allow the transmission of this higher torque from the high speed spool 32 to accessory components other than the permanent magnet alternator 90 and the fuel pump 80.

Figure 9:
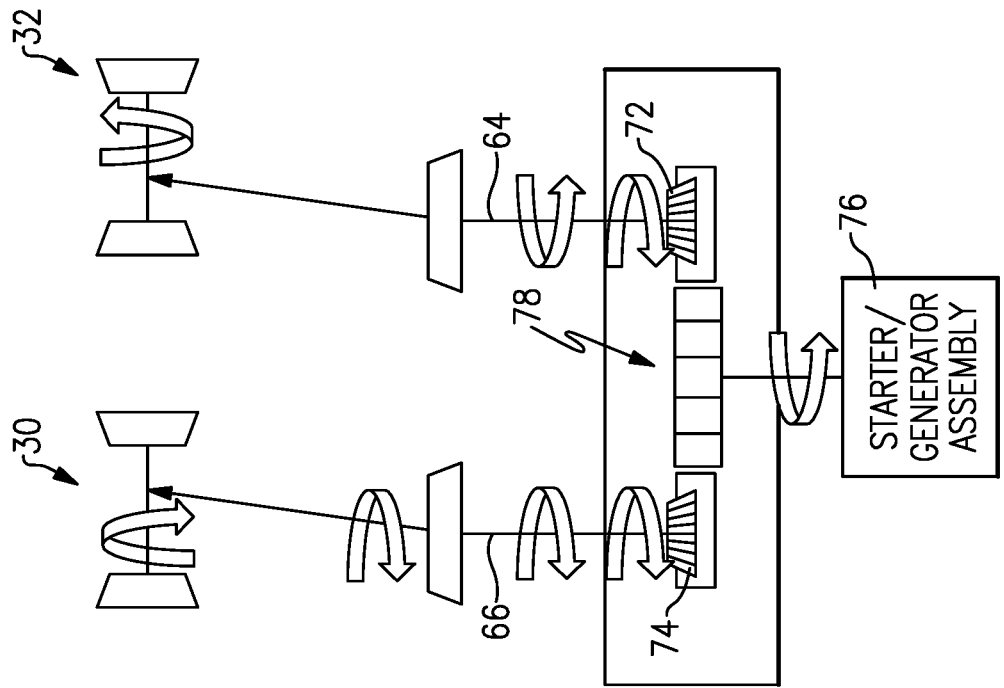
FIG. 9 is a schematic view of accessory gearbox operation during engine operation.

Once the high speed spool 32 has become operational, the low speed spool 30 will also begin to turn and shown in FIG. 9. Rotation of the high speed spool will result in turning of the second towershaft 66. The second towershaft 66 will in turn, turn the set of gears 78 through the second clutch 74 which will drive the starter generator assembly 76. Because the second clutch 74 is orientated and configured to enable the low speed spool 30 to drive the second towershaft 66 and in turn drive the starter generator assembly 76.

Accordingly, once the engine is running, the starter generator assembly 76 may produce electric power to drive any number of accessory units. Moreover, once the engine is operational, the accessory components can be electrically powered by the starter generator assembly 76 or mechanically powered by the low speed spool 30.

In this example, the starter generator assembly 76 comprises two separate variable frequency generators. The variable frequency generators are each rated at 90 kVA in some examples. Notably, since the starter generator assembly 76 can start the engine 20, no separate starter is required.

The variable frequency generators receives a rotational input to generate power utilized by components of the gas turbine engine 20. Other examples could incorporate other types of generators, and other types of electric machines. The transmission 92 facilitates incorporating the variable frequency generators rather than, for example, an integrated drive generator, since the transmission 92 permits operating the starter generator assembly 76 to operate in a narrower rpm range while still being driven by rotation of the inner shaft 40 through the second towershaft 66. Other examples, however, could include using one or more integrated drive generators as the starter generator assembly 76.

Driving the starter generator assembly 76 with the inner shaft 40 when generating power, rather than the outer shaft 50, can improve engine operability and performance. The exhaust gas temperature is also reduced as there is less power draw on the outer shaft 50.

The hydraulic pump 88 (FIG. 4) generally moves hydraulic fluid needed to move components of an air frame to which the gas turbine engine 20 is mounted. The transmission 92 permits operating the hydraulic pump 88 to be driven in a narrower rpm range while still being driven by rotation of the inner shaft 40 through the second towershaft 66. Driving the hydraulic pump 88 with the inner shaft 40, rather than the outer shaft 50, can improve engine operability and performance. The exhaust gas temperature is also reduced as there is less power draw on the outer shaft 50.

The oil pump 84 is driven at a fixed ratio relative to the speed of the second towershaft 66. That is, switching the transmission 92 between the various modes does not substantially change a ratio of rotational speeds between the second towershaft 66 and the oil pump 84. Thus, as the rotational speed of the second towershaft 66 varies, the rotational input to the oil pump 84 varies linearly with the rotational speed of the second towershaft 66.

The oil pump 84 can be dedicated to supplying oil for all low rotor bearings whether roller, ball, or tapered bearings, and further including supplying oil for the geared architecture 48 or fan drive gear system. In another example, the oil pump 84 is dedicated to supplying oil to the low rotor bearing system 38', which incorporates bearings directly supporting the inner shaft 40 and possibly a fan drive gear system. The bearings of the low rotor bearing system 38' are tapered bearings in some examples.

The rotational speed of the second towershaft 66 increases when the rotational speed of the inner shaft 40 increases. The inner shaft 40 may require additional lubrication, such as oil, directed to bearing systems 38 supporting the inner shaft 40 when the rotational speed of the inner shaft 40 increases.

The increased lubrication demands due to increasing the rotational speed of the inner shaft 40 are met by increasing the rotational input speed to the oil pump 84. In other words, the amount of oil moved to the bearing system 38' varies linearly with the rotational speed of the inner shaft 40. If the oil pump 84 were instead varying linearly with the rotational speed of the outer shaft 50, the oil pump 84 may move more oil than is required for lubrication. The excess oil would need to recirculated, or accommodated in some other way, which results in losses.

The oil pump 84 is considered a 60% oil pump as it accommodates approximately 60% of the lubrication requirements for the gas turbine engine 20. An additional pump, not shown, such as an electric pump, could be incorporated into the engine and powered by the starter generator assembly 76 to supply lubricant to other areas of the gas turbine engine 20.

The fuel pump 80 is utilized to supply fuel to the gas turbine engine 20 during start-up, and during other stages of operation. The fuel pump 80 is driven by the starter generator assembly 76 through the set of gears 78 during start up. Also, the permanent magnet alternator 90 can be used to power a full authority digital electronics control (FADEC), which can include the EEC 96. As the FADEC is used during start up, the permanent magnet alternator 90 is also driven by the starter generator assembly 76.

Referring again to the oil pump 84, an added feature of coupling rotation of the oil pump 84 with rotation of the inner shaft 40 is that the inner shaft 40 spins with the fan 42. Thus, during a windmilling event when the fan 42 is spinning without being driven by the inner shaft 40, the oil pump 84 can continue to pump oil lubricating the bearings associated with the inner shaft 40. If the oil pump 84 were decoupled from rotation with the inner shaft 40, another pump or an electronic pump could be required to move oil to lubricate the fan 42 when windmilling.

Accordingly, some of the exemplary accessory gearboxes and related components enable the use of compact high speed spool systems to enhance efficiencies.

Some of the disclosed exemplary embodiments can be used to replace pneumatic starters with a starter generator assembly having, for example, two electrical starter generators. The clutches permit the starter generators to drive the high spool for engine starting and then, as the engine starts and the low spool comes up to speed, a set of sprag clutches transfer the starter generators to be driven by low spool to handle the large amount of horsepower extraction for two generators. The transmission can facilitate accommodating the speed excursion range of the low spool.

Some of the exemplary embodiments can improve fuel burn over arrangements with a starter generator assembly driven in a generator mode by the high spool. Since the starter generators drive the high spool when the engine is started, and then transitioned away from the high spool, no additional starter on the high spool is required.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of operating a gas turbine engine, comprising:
   driving a first spool with a starter generator assembly through a first towershaft and a first clutch to start the gas turbine engine;
   driving the starter generator assembly through an accessory gearbox through a second clutch with a second towershaft coupled to a second spool once the gas turbine engine is started; and
   decoupling the starter generator assembly from the first spool once the first spool reaches an engine idle speed;
   driving the starter generator assembly and a hydraulic pump through a transmission in a first mode so that the starter generator assembly and the hydraulic pump are rotated at a first speed relative to the second towershaft, the transmission being driven by a set of gears of the accessory gearbox, the set of gears comprising at least three gears driven by the second towershaft;
   transitioning the transmission to a second mode so that the starter generator assembly and the hydraulic pump are rotated at a second speed relative to the second towershaft, wherein the first and second speeds are different from each other;
   driving an oil pump with the second towershaft through a gear of the set of gears when the starter generator assembly and the hydraulic pump are driven by the transmission, the oil pump driven at a third speed relative to the second towershaft when the transmission is in the first mode, and the oil pump driven at the third speed relative to the second towershaft when the transmission is in the second mode;
   supplying oil from the oil pump to a geared architecture that drives a tan of the gas turbine engine at a lower speed than the second spool;
   transitioning the transmission to a third mode;
   driving the transmission with the second towershaft through the set of gears to rotate the starter generator assembly and the hydraulic pump at a fourth speed relative to the second towershaft in the third mode; and
   wherein the first, second and fourth speeds are different from each other.

2. The method of claim 1, wherein the decoupling includes rotating the first towershaft at a speed greater than that of the starter generator assembly.

3. The method of claim 1, further comprising using a shaft of the second spool to drive the geared architecture to drive the fan.

4. The method of claim 1, wherein the first clutch and the second clutch are one-way mechanical clutch devices.

5. The method of claim 1, wherein the starter generator assembly comprises a first variable frequency generator and a second variable frequency generator.

6. The method of claim 2, wherein the first clutch and the second clutch are one-way mechanical clutch devices.

7. The method of claim 6, wherein the starter generator assembly comprises a first variable frequency generator and a second variable frequency generator.

8. The method of claim 6, wherein the step of supplying oil from the oil pump to the geared architecture occurs during a windmilling event.

9. A gas turbine engine assembly comprising:
a first spool having a first turbine operatively mounted to a first turbine shaft;
a second spool having a second turbine operatively mounted to a second turbine shaft, the first and second turbines mounted for rotation about a common rotational axis within an engine static structure, the first and second turbine shafts coaxial with one another;
a first towershaft coupled to the first turbine shaft, and a second towershaft coupled to the second turbine shaft;
an accessory drive gearbox with a first set of gears, the first set of gears comprising at least three gears driven by the second towershaft;
a starter generator assembly;
a hydraulic pump;
a first clutch disposed between the first towershaft and the starter generator assembly, the first clutch configured to enable the starter generator assembly to drive the first spool through the accessory drive gearbox;
a second clutch disposed between the second towershaft and the starter generator assembly, the second clutch configured to enable the second spool to drive the starter generator assembly through the accessory drive gearbox;
a transmission coupling the starter generator assembly and the hydraulic Dump to the first set of gears, the transmission driven by the first set of gears and transitionable between a first mode where the starter generator assembly and the hydraulic pump are driven at a first speed relative to the second towershaft in operation, and a second mode where the starter generator assembly and the hydraulic pump area driven at a second speed relative to the second towershaft in operation, and wherein the first and second speeds are different from each other; and
an oil pump driven by a gear of the first set of gears, wherein the starter generator assembly and the hydraulic pump are driven by the second towershaft at a third speed relative to the oil pump when the transmission is in the first mode, and the starter generator assembly and the hydraulic pump are driven by the second towershaft at a fourth speed relative to the oil pump when the transmission is in the second mode, and wherein the third and fourth speeds are different from each other.

10. The gas turbine engine assembly of claim 9, wherein the first and second turbine shafts are outer and inner shafts, respectively, and the first and second turbines are high and low pressure turbines, respectively.

11. The gas turbine engine assembly of claim 10, wherein the first towershaft is configured to rotate at a higher speed than the second towershaft.

12. The gas turbine engine assembly of claim 9, wherein the transmission is further transitionable to a third mode where the starter generator assembly and the hydraulic pump are driven at a fifth speed relative to the second towershaft, and wherein the first, second and fifth speeds are different from each other.

13. The gas turbine engine assembly of claim 12, wherein the transmission is further transitionable to at least one fourth mode where the starter generator assembly and the hydraulic Dump are driven at a sixth speed relative to the second towershaft, the sixth speed being different than each of the first, second, and fifth speeds.

14. The gas turbine engine assembly of claim 9, wherein the oil pump is configured to communicate oil to a geared architecture that drives a fan of the gas turbine engine at a lower speed than the second turbine shaft.

15. The gas turbine engine assembly of claim 9, further comprising a fan driven by a speed reduction device, wherein the speed reduction device is driven by the second turbine shaft.

16. The gas turbine engine assembly of claim 9, wherein the first clutch and the second clutch are one-way mechanical clutch devices.

17. The gas turbine engine assembly of claim 9, wherein the starter generator assembly comprises a first variable frequency generator and a second variable frequency generator.

18. The gas turbine engine assembly of claim 9, wherein the starter generator assembly comprises a first integrated drive generator and a second integrated drive generator.

19. The gas turbine engine assembly of claim 13, further comprising:
a fan driven by a speed reduction device, wherein the speed reduction device is driven by the second turbine shaft, and the speed reduction device drives the fan at a lower speed than the second turbine shaft;
wherein the first and second turbine shafts are outer and inner shafts, respectively, and the first and second turbines are high and low pressure turbines, respectively, such that the first towershaft is configured to rotate at a higher speed than the second towershaft;
wherein the first set of gears selectively mesh with both the first towershaft and the second towershaft;
wherein the oil pump is configured to communicate oil to the speed reduction device; and
wherein the first clutch and the second clutch are one-way mechanical clutch devices.

20. The gas turbine engine assembly of claim 19, wherein the starter generator assembly comprises a first variable frequency generator and a second variable frequency generator.

* * * * *

UNITED STATES PATENT AND TRADEMARK OFFICE
CERTIFICATE OF CORRECTION

PATENT NO. : 10,422,243 B2
APPLICATION NO. : 15/410049
DATED : September 24, 2019
INVENTOR(S) : Gabriel L. Suciu et al.

Page 1 of 1

It is certified that error appears in the above-identified patent and that said Letters Patent is hereby corrected as shown below:

In the Claims

In Claim 1, Column 10, Line 59; replace "a tan" with --a fan--

In Claim 9, Column 11, Line 45; replace "the hydraulic Dump" with --the hydraulic pump--

Signed and Sealed this
Tenth Day of December, 2019

Andrei Iancu
*Director of the United States Patent and Trademark Office*